(12) United States Patent
Frank

(10) Patent No.: US 8,201,895 B2
(45) Date of Patent: Jun. 19, 2012

(54) POWER SUPPLY ARCHITECTURE FOR AIRCRAFT BRAKES FITTED WITH ELECTROMECHANICAL ACTUATORS

(75) Inventor: David Frank, Paris (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 55 days.

(21) Appl. No.: 12/916,200

(22) Filed: Oct. 29, 2010

(65) Prior Publication Data

US 2011/0100770 A1 May 5, 2011

(30) Foreign Application Priority Data

Oct. 30, 2009 (FR) ...................... 09 05216

(51) Int. Cl.
*B60T 13/00* (2006.01)
(52) U.S. Cl. ........ 303/20; 303/122; 244/110 A; 244/111
(58) Field of Classification Search ............. 303/20, 303/22.4, 122, 122.03, 122.04, 122.05, 9, 303/DIG. 9; 244/110 A, 110 H, 110 R, 111; 307/10.1; 318/362; 701/3, 29, 33, 36, 70, 701/71, 76
See application file for complete search history.

(56) References Cited

U.S. PATENT DOCUMENTS

| | | | | |
|---|---|---|---|---|
| 6,296,325 | B1 * | 10/2001 | Corio et al. | ...................... 303/20 |
| 6,402,259 | B2 * | 6/2002 | Corio et al. | ...................... 303/20 |
| 2005/0189814 | A1 | 9/2005 | Mallevais et al. | |
| 2008/0142318 | A1 | 6/2008 | Griffith et al. | |
| 2008/0149436 | A1 | 6/2008 | Griffith et al. | |
| 2008/0258547 | A1 | 10/2008 | Ralea et al. | |
| 2008/0258548 | A1 | 10/2008 | May et al. | |
| 2009/0278401 | A1 * | 11/2009 | Summers et al. | ............... 303/20 |

FOREIGN PATENT DOCUMENTS

EP 1547918 A1 6/2005

* cited by examiner

*Primary Examiner* — Pamela Rodriguez
(74) *Attorney, Agent, or Firm* — Sughrue Mion, PLLC

(57) ABSTRACT

The invention relates to an architecture for powering aircraft brakes for an aircraft having at least two undercarriages, each having a certain number of wheels (L1, L2; R1, R2), each of the wheels being fitted with a brake having a certain number of electromechanical braking actuators (1, 2, 3, 4). The architecture has at least four power supply units that power groups of actuators taken from complementary groups of wheels.

5 Claims, 1 Drawing Sheet

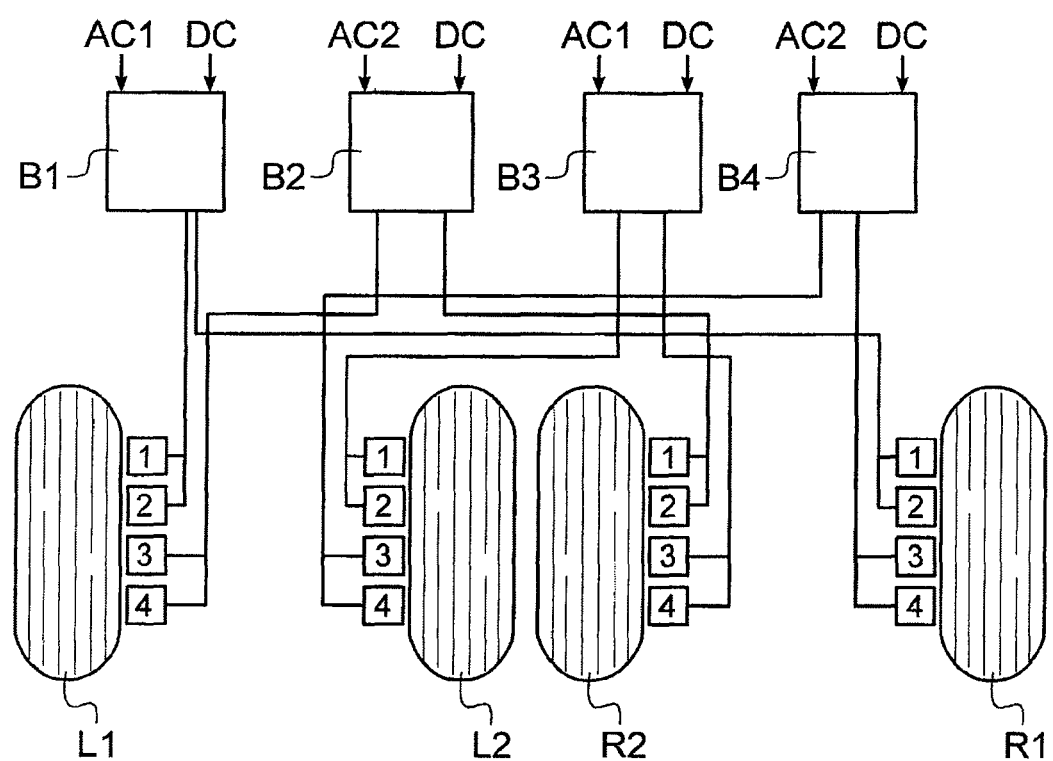

POWER SUPPLY ARCHITECTURE FOR AIRCRAFT BRAKES FITTED WITH ELECTROMECHANICAL ACTUATORS

The invention relates to a power supply architecture for aircraft brakes fitted with electromechanical actuators.

TECHNOLOGICAL BACKGROUND OF THE INVENTION

Aircraft are known that have undercarriages with wheels that are fitted with brakes having electromechanical actuators. In general, the brakes are powered by power supply units that deliver power to the actuators. The power supply units receive power from at least one electrical power supply bus of the aircraft that serves to convey the power generated by electricity generators that are driven by the jets or by an auxiliary power unit.

Aircraft manufacturers are paying ever increasing attention to the availability of various items of equipment, and in particular in the braking system. Various types of failure concerning the braking system may be taken into consideration:

1) a failure that does not prevent the aircraft being operated and that does not prevent it taking off, and for which a second failure occurring in flight would be without consequence for the safety or the performance of the braking system;

2) a failure that does not prevent operation of the aircraft and does not prevent it taking off, but for which a second failure occurring in flight would lead to degraded performance;

3) a failure preventing operation of the aircraft but that can be repaired during the turnaround time of the aircraft at an airport, enabling the aircraft to depart on time or with an acceptable delay (typically a few minutes);

4) a failure that prevents the aircraft from departing but that can be repaired after a considerable delay, but not requiring the flight to be canceled; and 5) a failure that prevents departure of the aircraft and that would lead to a delay on repair requiring the flight to be canceled.

Only failures of the first type enable the aircraft to be operated without any cost consequence, with it being possible for the faulty equipment to be repaired during programmed maintenance. Failures of the second type are in themselves only potentially limiting, since it is only in the event of a second failure that the performance of the braking system is diminished, thus leading the airline to limit the operating margins of the aircraft (in particular limiting the maximum weight of the aircraft). Failures of the third type have no operational impact but they are expensive, since they require non-programmed maintenance.

Failures of the fourth and fifth types give rise to extra costs associated with indemnifying passengers, and possibly to damaging the image of the airline.

It is therefore desirable to organize the braking system in such a manner that, insofar as possible, it is liable only to failures of the first type. A braking system is thus desired that remains available and operational regardless of the type of failure affecting one or other of the pieces of equipment of the braking system.

In this respect, documents U.S. Pat. No. 6,296,325 and U.S. Pat. No. 6,402,259 disclose braking system architectures that include a certain number of units (EMACS) that power brake actuators fitted to the wheels of main undercarriages, each EMAC controlling a group of brake actuators for each wheel of an undercarriage. In the architectures proposed, the failure of an EMAC is then very troublesome unless it is dealt with immediately. The aircraft can be operated with one failed EMAC. It suffices to call on the actuators that continue to be powered to deliver greater braking force in order to guarantee braking performance. However, if another EMAC that controls the complementary portion of the actuators fitted to the wheels of a given main undercarriage should fail, then the situation would become totally asymmetrical with all of the brake actuators of the wheels carried by that undercarriage then being incapable of exerting any braking action.

OBJECT OF THE INVENTION

An object of the invention is to propose a power supply architecture that preserves reasonable braking capacity for the aircraft even in the event of a power supply unit failing, in the event of an aircraft power source failing, or in the event of a power supply cable breaking.

BRIEF SUMMARY OF THE INVENTION

In order to achieve this object, the invention provides a power supply architecture for powering aircraft brakes for an aircraft having at least two undercarriages, each having a certain number of wheels, each of the wheels being fitted with a brake having a certain number of electromechanical braking actuators, wherein the architecture includes at least first, second, third, and fourth power supply units, the first and third power supply units being powered by a first power supply source, the second and fourth power supply units being powered by a second power supply source, the wheels on each of the undercarriages being grouped into first and second complementary groups and the power supply units powering complementary groups of braking actuators in each of the groups of wheels as follows:

the first power supply unit powers a group of actuators of each of the wheels of the first group of wheels of the first undercarriage, and a group of actuators of each of the wheels of the first group of wheels of the second undercarriage;

the second power supply unit powers a complementary group of actuators of each of the wheels of the first group of wheels of the first undercarriage, and a group of actuators of each of the wheels of the second group of wheels of the second undercarriage;

the third power supply unit powers a group of actuators of each of the wheels of the second group of wheels of the first undercarriage, and a complementary group of actuators of each of the wheels of the second group of wheels of the second undercarriage; and the fourth power supply unit powers a complementary group of actuators of each of the wheels of the second group of wheels of the first undercarriage, and a complementary group of actuators of each of the wheels of the first group of wheels of the second undercarriage.

Thus, the loss of one of the power supply units leads at most to the loss of some of the actuators of one of the groups of wheels associated with that power supply unit. Since these lost actuators are distributed over both undercarriages, each undercarriage has a sufficient number of actuators that can still be powered to be able to ensure that braking is symmetrical.

This failure does not affect the operation of the aircraft since the loss of these actuators is easily compensated by causing the actuators of the corresponding complementary portion to develop a greater braking force.

A subsequent failure of another power supply unit can still be handled acceptably, i.e. braking can continue to be provided by both main undercarriages, with a level of asymmetry that, at most, can still be compensated without loss of performance, such that the first failure is a failure of the first type.

BRIEF DESCRIPTION OF THE FIGURES

The invention can be better understood in the light of the sole FIGURE which is a diagram of a braking architecture of the invention.

DETAILED DESCRIPTION OF THE FIGURES

The invention is described below with reference to an airplane of the A320® or B737® type or any other airplane having four braked wheels (business airplane, regional transport airplane, . . . ), having two main undercarriages, each having two braked wheels, given respective references L1 and L2 for the wheels carried by the left main undercarriage and R1 and R2 for the wheels carried by the right main undercarriage.

Each of the wheels is fitted with an electromechanical brake, and in this example it comprises four actuators per brake (given respective numbers 1, 2, 3, and 4 for each of the wheels).

The architecture comprises four power supply units given respective references B1, B2, B3, and B4, that are arranged to receive electrical power from one of the power buses of the aircraft. Specifically, the power supply units B1 and B2 receive power from a first power supply bus AC1 (typically providing alternating current (AC) at 115 volts and 400 hertz), while the power supply units B2 and B4 receive power from a second power bus AC2 (having the same characteristics) that is independent of the first power bus. The power supply units may be fed with non-rectified AC or with rectified AC.

Furthermore, each of the four power supply units is connected to a direct current (DC) source (e.g. the batteries of the aircraft, typically delivering 28 volts DC).

The power supply units power the brake actuators in the following configuration:
  the unit B1 powers the actuators 1 and 2 of the wheel L1 carried by the left main undercarriage, and the actuators 1 and 2 of the wheel R1 carried by the main right undercarriage;
  the unit B2 powers the actuators 3 and 4 of the wheel L1 carried by the left main undercarriage and the actuators 1 and 2 of the wheel R2 carried by the right main undercarriage;
  the unit B3 powers the actuators 1 and 2 of the wheel L2 carried by the left main undercarriage and 3 and 4 of the wheel R2 carried by the right main undercarriage; and
  the unit B4 powers the actuators 3 and 4 of the wheel L2 carried by the left main undercarriage and the actuators 3 and 4 of the wheel R1 carried by the right main undercarriage.

This configuration presents the advantages shown by the table below, which shows the incidence of a failure of any one of the power supply units on the braking capacity of the airplane:

| Failed unit | B1 | B2 | B3 | B4 |
|---|---|---|---|---|
| Working actuators on L1 | 3, 4 | 1, 2 | 1, 2, 3, 4 | 1, 2, 3, 4 |
| Working actuators on L2 | 1, 2, 3, 4 | 1, 2, 3, 4 | 3, 4 | 1, 2 |
| Working actuators on R2 | 1, 2, 3, 4 | 3, 4 | 1, 2 | 1, 2, 3, 4 |
| Working actuators on R1 | 3, 4 | 1, 2, 3, 4 | 1, 2, 3, 4 | 1, 2 |

It thus be seen that the failure of any one of the power supply units causes two actuators to be lost on one of the wheels of one of the undercarriages and two actuators to be lost on one of the wheels of the other undercarriage in such a manner that each of the undercarriages continues to have six braking actuators that can be powered. It thus remains possible to perform braking that is completely symmetrical.

There follows an examination of the consequences of another one of the units failing. In the tables below, there are listed which actuators continue to be powered for one of the units failing (marked in the header of the table) and for another one of the units failing in succession.

| Unit B1 failed | B2 | B3 | B4 |
|---|---|---|---|
| Working actuators on L1 | — | 3, 4 | 3, 4 |
| Working actuators on L2 | 1, 2, 3, 4 | 3, 4 | 1, 2 |
| Working actuators on R2 | 3, 4 | 1, 2 | 1, 2, 3, 4 |
| Working actuators on R1 | 3, 4 | 3, 4 | — |

| Unit B2 failed | B1 | B3 | B4 |
|---|---|---|---|
| Working actuators on L1 | — | 1, 2 | 1, 2 |
| Working actuators on L2 | 1, 2, 3, 4 | 3, 4 | 1, 2 |
| Working actuators on R2 | 3, 4 | — | 3, 4 |
| Working actuators on R1 | 1, 2, 3, 4 | 1, 2, 3, 4 | 1, 2 |

| Unit B3 failed | B1 | B2 | B4 |
|---|---|---|---|
| Working actuators on L1 | 3, 4 | 1, 2 | 1, 2, 3, 4 |
| Working actuators on L2 | 3, 4 | 3, 4 | — |
| Working actuators on R2 | 1, 2 | — | 1, 2 |
| Working actuators on R1 | 3, 4 | 1, 2, 3, 4 | 1, 2 |

| Unit B4 failed | B1 | B2 | B3 |
|---|---|---|---|
| Working actuators on L1 | 3, 4 | 1, 2 | 1, 2, 3, 4 |
| Working actuators on L2 | 1, 2 | 1, 2 | — |
| Working actuators on R2 | 1, 2, 3, 4 | 3, 4 | 1, 2 |
| Working actuators on R1 | — | 1, 2 | 1, 2 |

Thus, it can be seen that the loss of two power supply units always leaves four actuators powered on each of the undercarriages. Depending on circumstances, that may involve two actuators per wheel or four actuators on the same wheel, the other wheel then no longer having actuators that can be powered. Thus, two failures do not cause a total loss of braking on more than one wheel. In practice, it remains possible to brake with at least three wheels.

Nevertheless, it remains possible for braking to be performed symmetrically. As with a single failure, it remains possible to compensate at least in part for the loss of non-powered actuators by requiring the remaining actuators that are powered to deliver extra braking force.

Furthermore, the loss of one of the power buses AC1 or AC2 limits the power available for powering the units concerned (respectively B1 and B3 or B2 and B4) to the power available from the DC power source. Nevertheless, it does not cause a loss of the entire braking capacity of the actuators connected to the power supply units in question. In particular, the units are advantageously powered by an auxiliary power source, such as a DC power source or a battery.

It should be observed that each of the power supply units has at least two distinct outlets, one for each of the pairs of actuators it powers. Thus, the loss of an electrical connection between a unit and the actuators in question leads to the loss of only two actuators and not to all four actuators powered by the unit.

It should be understood that in the FIGURE the power connections are shown diagrammatically as extending directly between the power supply units and the actuators. Where appropriate, and assuming that they are not incorporated in the power supply units, it is possible to interpose an actuator control unit between the power supply unit and each pair of actuators on each of the wheels, where such an actuator control unit (equivalent to the EMACs of the above-mentioned document) shapes the power it receives from the power supply units so as to deliver power in calibrated manner to the two actuators connected to the control unit in response to a braking setpoint generated by a braking computer.

Preferably, each actuator is dimensioned so as to be able to develop, at least occasionally, a braking force that is equivalent to the force developed by two actuators of a brake for which all of the actuators are powered during braking so as to bring the corresponding wheel to its locking limit while landing on a dry runway.

For such braking, the maximum force developed by an actuator of a brake having all of its actuators powered is of the order of 66% of the nominal force. It is therefore appropriate to dimension the actuators so that they are capable, occasionally, of delivering a force that is equal to 132% of the nominal force.

Thus, with only two actuators out of the four, it is possible, on the wheel concerned, to develop a braking force that is equal to 132/2=66% of the nominal braking force, which corresponds to the force developed by a brake with all of its actuators powered prior to the wheel becoming locked when landing on a dry runway. As a result, it is possible to ensure nominal braking performance on a dry runway.

The invention is not limited to the above description, but on the contrary covers any variant coming within the ambit defined by the claims.

In particular, although in the example shown, the wheels are fitted with brakes having even numbers of actuators, with the actuators being distributed in a first group of actuators (actuators 1 and 2) powered by one of the units, and a complementary set of actuators (actuators 3 and 4) powered by the other unit, and with the groups having equal number of actuators, it is possible more generally to distribute the actuators in two groups even if the number of actuators is odd. Under such circumstances, it is advantageous to define for each wheel two groups of actuators that differ by no more than one actuator.

Although the invention is described with reference to an aircraft having two main undercarriages, each having two braked wheels, the invention can immediately be generalized to an aircraft having two main undercarriages each having more than two braked wheels, e.g. four or six. It suffices to define on each of the undercarriages two groups of wheels (e.g. each group of wheels comprises the wheels carried on a given side of the undercarriage). On each of the groups of wheels (and thus of brakes) as defined in this way, a first group of actuators is powered by one of the units and a complementary second group is powered by another unit, in the arrangement of the invention. The invention can also be generalized to aircraft having more than two main undercarriages. For example, if the aircraft has two main undercarriages under its wings and one central main undercarriage with braked wheels (as is the case for the A340®-600) it suffices to allocate the wheels carried by the central main undercarriage to one or other of the groups of wheels formed by the wheels of the main undercarriages under the wings.

By extension, and to use the same vocabulary as in the claims, it is possible to refer to a given group of wheels, even if a group comprises only one wheel in the example in question.

What is claimed is:

1. A power supply architecture for powering aircraft brakes for an aircraft having at least two undercarriages, each having a certain number of wheels (L1, L2; R1, R2), each of the wheels being fitted with a brake having a certain number of electromechanical braking actuators (1, 2, 3, 4), wherein the architecture includes at least first, second, third, and fourth power supply units, the first and third power supply units (B1, B3) being powered by a first power supply source (AC1), the second and fourth power supply units (B2, B4) being powered by a second power supply source (AC2), the wheels on each of the undercarriages being grouped into first and second complementary groups (L1; R1; L2; R2) and the power supply units powering complementary groups of braking actuators in each of the groups of wheels as follows:

the first power supply unit (B1) powers a group of actuators (1, 2) of the first group of wheels (L1) of the first undercarriage, and a group of actuators (1, 2) of the first group of wheels (R1) of the second undercarriage;

the second power supply unit (B2) powers a complementary group of actuators (3, 4) of the first group of wheels (L1) of the first undercarriage, and a group of actuators (1, 2) of the second group of wheels (R2) of the second undercarriage;

the third power supply unit (B3) powers a group of actuators (1, 2) of the second group of wheels (L2) of the first undercarriage, and a complementary group of actuators (3, 4) of the second group of wheels (R2) of the second undercarriage; and the fourth power supply unit (B4) powers a complementary group of actuators (3, 4) of the second group of wheels (L2) of the first undercarriage, and a complementary group of actuators (3, 4) of the first group of wheels (R1) of the second undercarriage.

2. A power supply architecture according to claim 1, adapted to an aircraft having exactly two main undercarriages, each provided with two braked wheels (L1, L2; R1, R2) such that on each undercarriage each group of wheels is constituted by one of the wheels carried by the undercarriage.

3. A power supply architecture according to claim 1, wherein each group of actuators of a given group of wheels has a number of actuators equal to the number of actuators of the complementary group of actuators, or differing therefrom by no more than one.

4. A power supply architecture according to claim 1, wherein each of the two groups of actuators powered by a given unit is powered by means of a distinct cable.

5. A power supply architecture according to claim 1, wherein each actuator is dimensioned to develop, at least occasionally, a braking force equivalent to the force developed by two actuators of a brake in which all of the actuators are powered during braking taking the corresponding wheel to its locking limit during a landing on a dry runway.

* * * * *